United States Patent [19]
Videon

[11] 3,780,817
[45] Dec. 25, 1973

[54] WEIGHING DEVICES
[76] Inventor: John A. Videon, 1336 S.E. 38th Pl., Gainesville, Fla. 32601
[22] Filed: Feb. 28, 1969
[21] Appl. No.: 803,285

[52] U.S. Cl.............. 177/136, 177/211, 177/234, 73/88.5 R
[51] Int. Cl.... G01g 19/08, G01g 3/14, G01g 23/26
[58] Field of Search............... 177/136, 137, 138, 177/211, 234; 73/88.5, 141 A

[56] References Cited
UNITED STATES PATENTS
| | | | |
|---|---|---|---|
| 1,294,298 | 2/1919 | Moulton | 177/137 |
| 1,343,556 | 6/1920 | Gans | 177/137 |
| 2,666,262 | 1/1954 | Ruge | 177/211 X |
| 3,411,348 | 11/1968 | Schultheis, Jr. | 73/141 A |
| 3,426,586 | 2/1969 | Kadlec | 177/136 X |
| 3,444,499 | 5/1969 | Lovelace | 73/88.5 X |

Primary Examiner—George H. Miller, Jr.
Attorney—Hood, Gust, Irish and Lundy

[57] ABSTRACT

This invention is directed to a load-indicating apparatus for measuring the deflection of a relatively stiff non-spring member. The apparatus includes a non-spring member such as the stationary axle of a truck which is capable of flexing in a predetermined direction under load. Mounted on the axle are two spaced-apart, rigid supports which upstand therefrom in a direction whereby the upper ends of the supports will move toward and away from each other as the axle flexes. A transducer is connected to the upper ends of the supports for measuring the distance therebetween as they move and to provide an indication of the load on the axle.

5 Claims, 10 Drawing Figures

INVENTOR
JOHN A. VIDEON
by Hood, Gust, Irish & Lundy
Attorneys

WEIGHING DEVICES

BACKGROUND OF THE INVENTION

1. Field of the Invention

The present invention relates to load-indicating apparatus and more specifically to apparatus having strain gauges secured operatively to a non-spring member such as the axle of a vehicle whereby the load supported by the axle can be determined.

2. Description of the Prior Art

This invention constitutes an improvement on the methods and apparatuses disclosed in John A. Videon application Ser. No. 481,704, filed Aug. 23, 1965, now Pat. No. 3,443,652, issued May 13, 1969 entitled "Vehicle Weighing Device".

Since each state today has limits on the gross weight of trucks which can legally travel over its highways, it has become more necessary than ever before to provide a device for quickly and accurately determining the weight of a truck. Each state's load limits are expressed either in terms of weight per axle or gross weight of the vehicle.

The most widely used method of determining the weight of a vehicle is by the use of a scale upon which the entire vehicle or a portion of the vehicle is driven. Consequently, a vehicle can be weighed only at those locations which have the necessary weighing facilities. Such scales are the standard of the trucking industry, mostly because of the general acceptance of this form of weighing device. Several devices have been proposed which measure the relative displacement of the springs, the relative displacement between the vehicle body and the frame and/or the forces of displacement upon the spring hangers or the springs themselves. However, devices which indicate the displacement between the vehicle body and the frame require extensive modification of the vehicle. Further, devices which measure or indicate the relative displacement of the springs are subject to relatively large errors due to the friction and wear occurring in the vehicle undercarriage. These devices last-mentioned are also subject to large deflections, and thus must be capable of accurately measuring relatively large deflections without breakage. Conventional resistance strain gauges will not survive this treatment. Still further, devices which measure the forces of displacement on the spring hangers of a vehicle cannot indicate the weight on each axle independently of the other axles. Therefore, it is desirable to provide a device which can be mounted on a vehicle which is not subject to the effects of friction or wear of the undercarriage of the vehicle and which can indicate each axle weight independently. Since such devices which utilize conventional strain gauges inherently are subject to errors resulting from changes in the temperature of the gauges and to errors resulting from the improper positioning of the gauges on the vehicle, it is further desirable to provide a device which cancels such errors, and other errors which are directly proportional to the elongation of the gauges so the device can indicate the correct weight of the vehicle after an initial calibration of the device.

SUMMARY OF THE INVENTION

In accordance with the broader aspects of this invention, there is provided a load-indicating apparatus for measuring the deflection of a relatively stiff non-spring member such as the stationary axle or axle housing of a vehicle. The apparatus includes the non-spring member which is capable of slight flexing movement under load in a predetermined direction. Two spaced-apart rigid supports are fixedly secured to the non-spring member and upstand thereon in a direction whereby the upper ends of the supports move toward and away from each other as the member flexes. Means such as strain gauges are mounted on or connected to the upper ends of the supports for measuring the distance therebetween as they move.

It is an object of this invention to provide a transducer apparatus for use in connection with indicating loads on vehicles or the like which provides mechanical amplification of bending or flexing movement of a load-carrying member such as an axle, thereby permitting use of the more common movement-responsive devices such as strain gauges for determining the extent of such bending or flexing.

It is another object of this invention to provide a single transducer assembly embodying two or more strain gauges which may be preassembled and tested prior to the installation of the assembly on a load-carrying member such as the axle of a vehicle.

It is another object of this invention to provide a transducer assembly which is simple in construction and facile to install on the axle of an ordinary trailer or truck-type vehicle.

Further objects will become apparent as the description proceeds.

BRIEF DESCRIPTION OF THE DRAWINGS

The above-mentioned and other features and objects of this invention and the manner of attaining them will become more apparent and the invention itself will be best understood by reference to the following description of an embodiment of the invention taken in conjunction with the accompanying drawings, wherein.

DESCRIPTION OF THE PREFERRED EMBODIMENT

This invention constitutes an improvement of the arrangement disclosed in Videon application Ser. No. 481,704, filed Aug. 23, 1965, now Pat. No. 3,443,652 issued May 13, 1969, and entitled "Vehicle Weighing Device". In this prior patent, strain gauges are mounted on the top and bottom sides of vehicle axles at a location where maximum axle deflection may be detected. The arrangement of the strain gauges is such that no temperature compensating devices are required, the apparatus may be calibrated for a specific vehicle such that the correct weight may be indicated without further calibration, and the strain gauges are so located that the stresses which they do undergo will be well within the extension and compression limits thereof. The strain gauges are applied directly to an axle on the top and bottom sides thereof such that they are extended and shortened by amounts the same as the contiguous portions of the axle. Inasmuch as axles of this type are designed to bend or flex only minimally under load, it follows that the strain gauges will be affected similarly. Since it is the change in resistance of such strain gauges that is used as the measure of axle flexing, and since such resistance changes are correspondingly small, sensitive and relatively expensive resistance-measuring equipment must be used in providing the necessary accuracy in registering resistance change.

In the present invention, the strain gauges are not mounted directly on the axle but on the device attached to the axle which produces mechanical amplification of the axle flexure. This obviates attaching the strain gauges directly to the axle which requires a fair degree of skill and further permits the use of electronic amplifiers of lower gain which are more stable and accurate over a long period of time.

Figure 1:
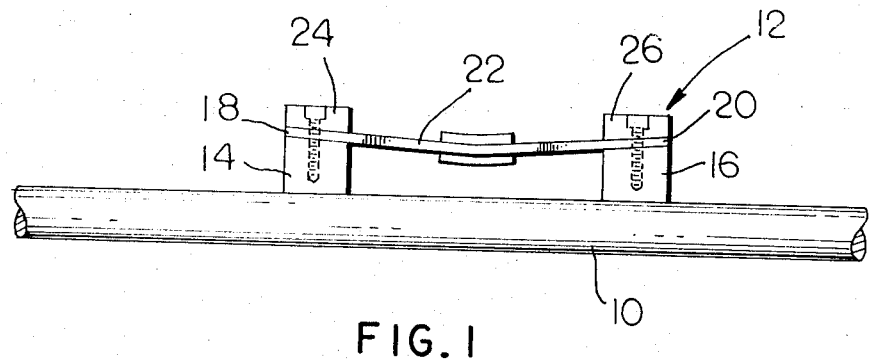
FIG. 1 is a side elevation of one embodiment of this invention shown mounted on the stationary axle of a vehicle.
Figure 2:
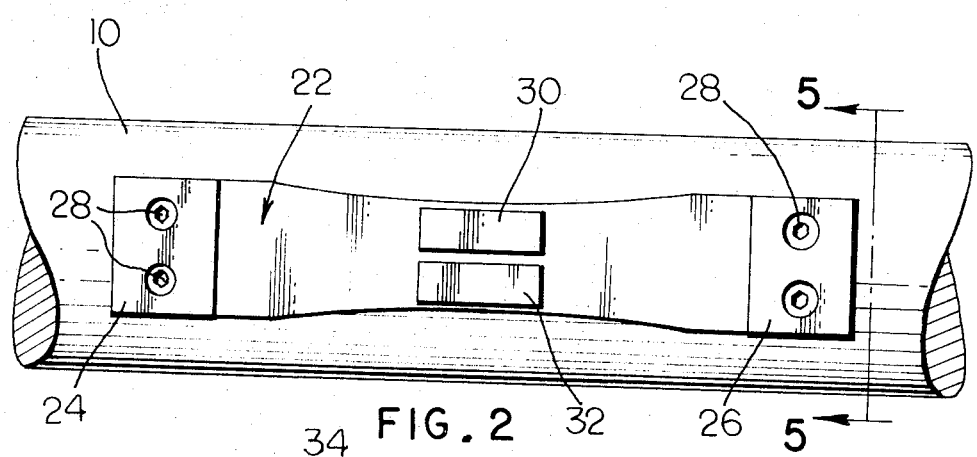
FIG. 2 is a top plan view thereof.
Figure 3:
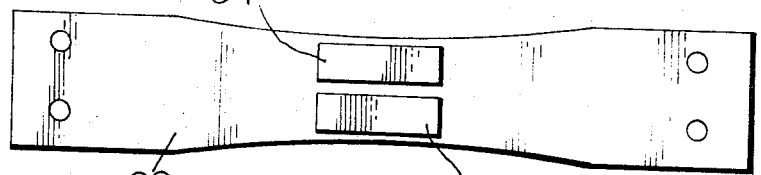
FIG. 3 is a bottom plan view of the transducer assembly.

Referring to the drawings, and more specifically to FIGS. 1 through 5, a stationary axle of a conventional truck, trailer or the like is indicated by the numeral 10. This axle 10 is part of the conventional undercarriage which includes both spring and axle members. In this disclosure, such axle is an example of a non-spring member in contrast to the springs which form a part of the undercarriage. A transducer assembly indicated generally by the reference numeral 12 is mounted on the top side of the axle 10 as shown more clearly in FIG. 1 and includes two upstanding supports or steel blocks 14 and 16 which are spaced apart and preferably located at a point on the axle 10 having maximal deflection under load. The upper surfaces 18 and 20 of the blocks 14 and 16, respectively, are flat and inclined downwardly toward each other as shown. Mounted on these surfaces is a flat bar 22 of spring metal shaped as shown in FIGS. 2 and 3. This bar 22 unstressed is straight, but when secured flat against the inclined surfaces 18 and 20 bows downwardly as shown in FIG. 1. Securing the opposite ends of the bar 22 to the surfaces 18 and 20 of the supporting blocks are two clamping blocks 24 and 26 which receive bolts 28 threaded into the supports 14 and 16.

Adhered to the top and bottom surfaces of the bar 22 are four transducers 30, 32, 34 and 36, transducers 30 and 32 being mounted on the top surface and transducers 34 and 36 on the bottom. Preferably, they are mounted in side-by-side position as shown near the center of the bar 22, but alternatively they may be positioned end-to-end. These transducers are conventional resistance-type strain gauges adapted to lengthen and shorten in accordance with the lengthening and shortening of the top and bottom surfaces of the bar 22 as it flexes.

Figure 4:
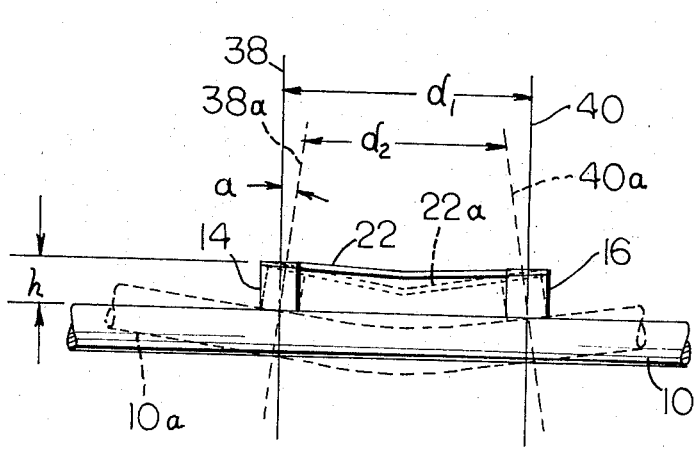
FIG. 4 is a diagrammatic illustration of the arrangement of the preceding FIGS. used in explaining the operation of this invention.
Figure 5:
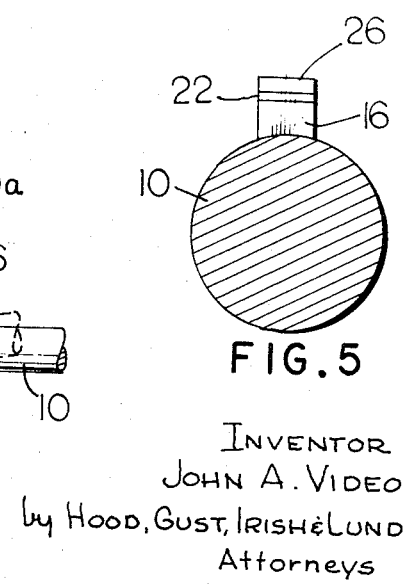
FIG. 5 is a cross-section taken substantially along section line 5—5 of FIG. 2.

Referring to FIG. 4, the mechanism in undeflected condition is illustrated by the solid lines and in deflected or flexed condition by the dashed lines. In explaining the operation of the invention described thus far, it may be assumed that when the axle 10 is loaded, it flexes proportionately as indicated by the numeral 10a and the bar 22 is flexed to the position 22a. This flexure of the axle 10 moves the tops of the supports 14 and 16 inwardly toward each other, thereby tending to shorten the bar 22, and causing it to flex. This shortening or flexing of the bar 22 is in proportion to the height $h$ of the supports 14, 16, thereby providing the relationship in which the deflection of the bar 22 is proportional to the difference in separation between the longitudinal axes 38, 40 of the supports 14, 16 and the deflected positions thereof as indicated by the numerals 38a, 40a. The bar 22 with transducers 30, 32, 34, 36 secured thereto serves as a means for measuring the distance between the upper ends of supports 14, 16 and correspondingly, for measuring the load on the non-spring member 10. This difference may be represented by the relationship $(d_1 - d_2)$. The change in angular relation between the axis 38 and 38a is represented by the symbol $\alpha$. Therefore:

$$(d_1 - d_2) = -2h \text{ (tangent } \alpha\text{)}.$$

It is thereby shown that the bar 22 deflects more than the axle 10 for a given angle $\alpha$ and produces amplification of the axle motion. Thus, strain gauges mounted on the bar 22 will be subjected to greater strains than they would if they were mounted on the axle 10.

Figure 10:
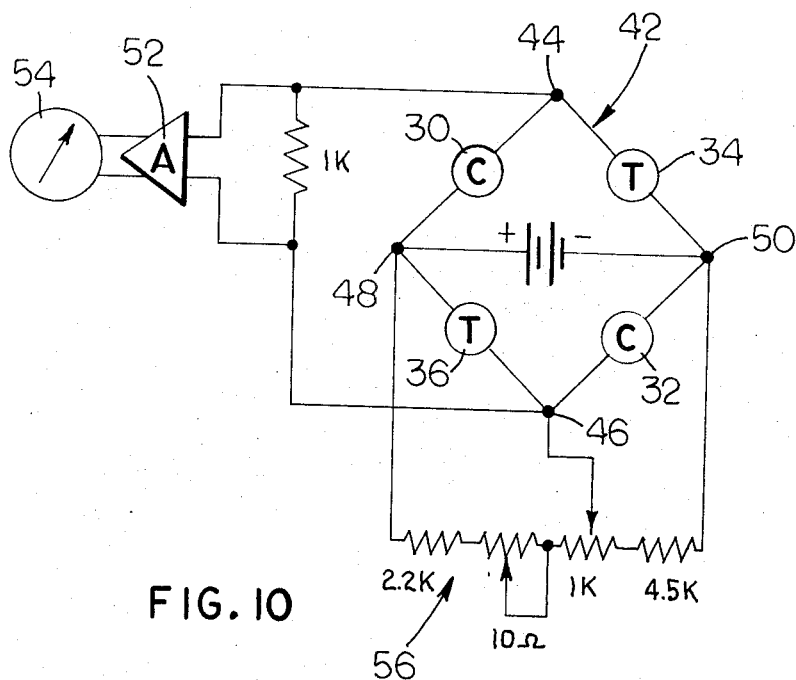
FIG. 10 is a circuit diagram of a typical installation of this invention.

Now referring specifically to FIG. 10, the four strain gauges 30, 32, 34 and 36 are connected into a Wheatstone bridge 42 which comprises four legs, each leg having one of the strain gauges therein. The legs having the gauges 30 and 32 (the gauges secured to the upper side of the bar 22) are connected at the opposite ends thereof to the legs having the gauges 34 and 36 therein. If the resistance of gauge 30 becomes smaller due to the compression of the gauge, and at the same time the resistance of gauge 34 becomes larger due to the elongation thereof, the voltage across the terminals 44 and 48 decreases by an amount proportional to the sum of the changes in resistance of the two last-mentioned gauges. Likewise, if the resistance of the gauge 32 becomes smaller due to the compression of the gauge and the resistance of the gauge 36 becomes larger due to the elongation thereof, the voltage across the terminals 46 and 48 becomes larger by an amount proportional to the sum of the change in resistances of the gauges 32 and 36.

Since the change in the voltage at junctures 44 and 46 have opposite signs, the potential thereacross is increased by an amount proportional to the sum of the change in resistance of all four of the gauges 30, 32, 34 and 36. By this means, the small output voltage of a single strain gauge is increased by a factor of four when the gauges are secured to the same flexed member 22 and interconnected as illustrated in FIG. 10. Further, since the changes in resistance of the gauges due to temperature are the same, such errors are cancelled by the bridge circuit. For example, an increase in the resistance of each of the gauges 30 and 32 results in the voltage at the juncture 44 becoming more positive. The same resistance increases in gauges 34 and 36 result in the voltage at juncture 46 becoming more positive, such that the voltage measured between junctures 44 and 46 remains the same.

The voltage changes across the terminals 44 and 46 are measured by a conventional amplifier 52 having connected into its output circuit a voltmeter 54 calibrated preferably in pounds of weight. Thus, the degree of flexure in the member 22 and accordingly the load on the non-spring member 10 may be determined by reading the meter 54.

Transducer assemblies 12 are mounted on each of the axles and the Wheatstone bridges are connected into an electrical circuit adapted to provide an indication of individual axle loadings as well as the aggregate thereof. This electrical system is disclosed in the Videon patent previously mentioned and for reference purposes may be regarded as being incorporated herein. Referring still to FIG. 10, the resistors 56, two of them being fixed and the other two variable, are connected to the terminals 46, 48 and 50 as shown to provide for calibration of the apparatus when initially installed. For example, if it is desired to determine the loading on a given axle which is in addition to the empty weight of the vehicle, these resistors 56 may be adjusted with the vehicle empty to provide a zero reading on the meter 54. Thus, when the load is added, the reading on the meter 54 will indicate the weight of this load.

Greater sensitivity, hence accuracy, is achieved by securing the strain gauges 30, 32, 34 and 36 to the bar 22 when the latter is in its unstressed, straight condition. Therefore, when the bar 22 is mounted on its supports 14 and 16, it is bowed downwardly as shown in FIG. 1, thereby stressing the strain gauges. Thus, any flexing of the axle 10 as already explained in connection with FIG. 4 will result in the strain gauges being stressed from the preceding stressed condition which thereby serves to produce an instantaneous change in the resistance capable of being sensed by the bridge circuit 42 and amplifier 52.

Figure 6:
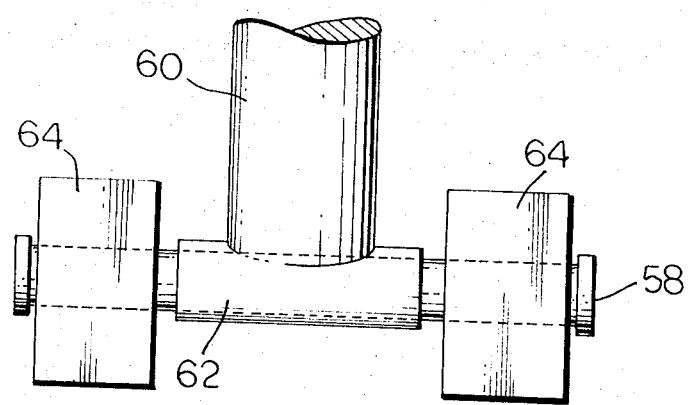
FIG. 6 is a front or rear elevation of another embodiment of this invention as used in connection with the landing gear strut of a heavy-duty trailer.
Figure 7:
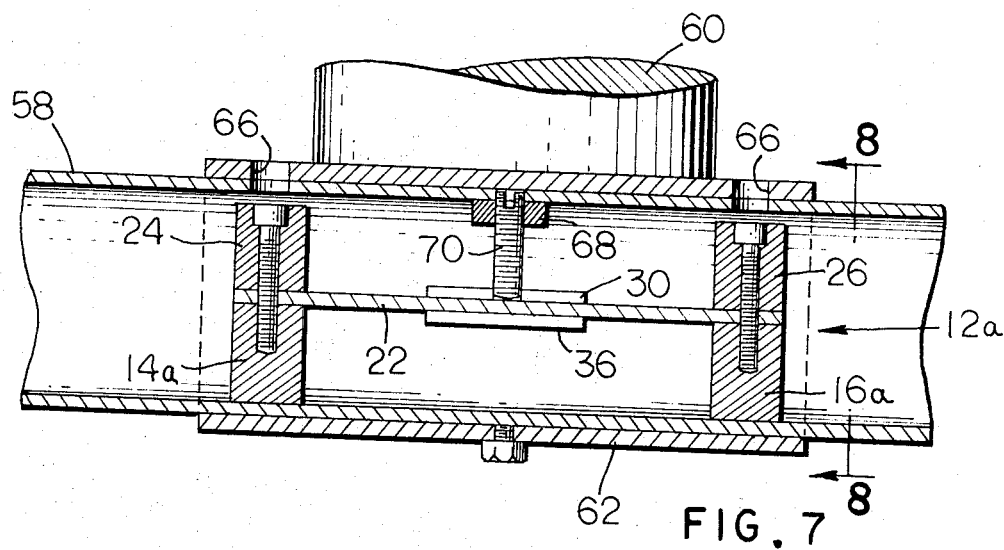
FIG. 7 is a fragmentary sectional view of the transducer assembly installed in the axle or pin of the mechanism of FIG. 6.
Figure 8:
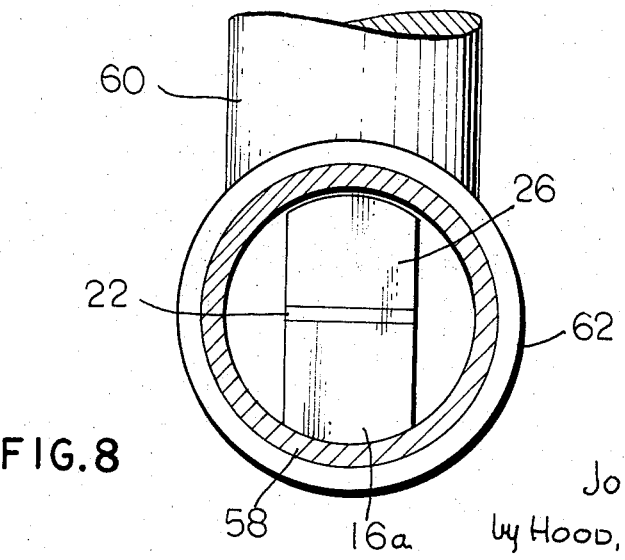
FIG. 8 is a cross-section taken substantially along section line 8—8 of FIG. 7.

The transducer assembly 12 may be installed on the interior of a hollow axle as indicated in FIGS. 6, 7 and 8. This hollow axle, indicated by the numeral 58, is a part of the strut undercarriage of a semi-trailer, this undercarriage including the usual strut 60, an axle-mounting sleeve 62 secured to the bottom end of the strut 60, an axle 58 received by the sleeve 62 and two pads or wheels 64 on the outer ends of the axle 58. Supports or blocks 14a and 16a having horizontal rather than inclined upper surfaces are welded or otherwise rigidly secured to the bottom of the axle 58 as shown. The bar 22 is secured to the tops of the supports 14a and 16a as previously explained, and clamping blocks 24 and 26 are mounted on top of the ends of the bar 22 and secure the latter to the supports 14a and 16a by means of the bolts illustrated. The upper ends of the clamping blocks 24 and 26 have slight clearances with the upper portion of the axle 58 such that they may move relative to the latter. Openings 66 in the outer ends of the sleeve 62 provide access to the screws in the clamping blocks 24, 26.

A nut member 68 is welded to the inside wall of the top portion of the axle 58 and receives a set screw 70 which bears at its lower end against the midportion of the bar 22 for stressing the latter downwardly. This pre-stressing is performed prior to the insertion of the axle 58 in the sleeve 62, and the set screw 70 is so formed that it will not interfere with this insertion.

As weight is added to the strut 60, the axle 58 will bend the same as axle 10 previously described, thereby producing a deflection of supports 14a and 16a and a corresponding bending movement of the bar 22 as supports 14a, 16a move toward each other, and a change in resistance in the strain gauges 30, 32, 34 and 36 mounted on the bar 22. This bar 22 and the strain gauges thereon may be identical to those previously explained in the embodiment of FIGS. 1 through 5. The weight on the strut 60 may be read out the same as previously explained in connection with FIG. 10.

Figure 9:
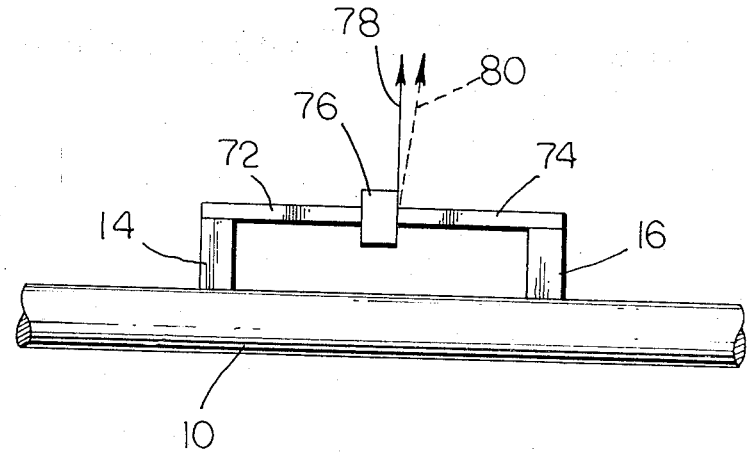
FIG. 9 is a side view of another embodiment of this invention.

In FIG. 9 is illustrated another embodiment of this invention wherein like numerals indicate like parts. On the upper ends of the supports 14 and 16 are mounted two rigid bars 72 and 74 having ends spaced apart and receiving therebetween a conventional pressure transducer indicated by the numeral 76. This transducer 76 is secured to the respective ends of the bars 72 and 74 and provides means for indication of movement between these bar ends. This transducer 76 may take the form of any conventional transducer, such as a piston and cylinder, an air bellows or the like. In the illustration, this transducer 76 may be regarded as taking the form of an air bellows having a pointer 78 on one end thereof. As the axle 10 bends and moves the upper ends of the supports 14 and 16 toward each other, the two ends of the bars 72 and 74 move closer together, thereby distorting the opposite ends of the bellows 76. By making these opposite ends of the bellows 76 of flexible metal which curves or dishes inwardly when the bars 72 and 74 move closer together, the pointer 78 will be caused to move to the dashed line position 80, thereby indicating that the axle 10 has flexed. The greater the flexure of the latter, the greater will be the movement of the pointer 78.

Each of the transducer assemblies 12 as well as the one in FIG. 9 can be fabricated in mass quantities at the factory, there tested and made weather and shock resistant. They may be installed properly on axles or similar non-spring members by persons of little skill. By reason of the greater bending of the bars 22, mechanical amplification of the deformation of the non-spring member is obtained, thereby providing means for measuring even the slightest bending or flexing thereof. This results in greater accuracy and reliability of the apparatus.

While there have been described above the principles of this invention in connection with specific apparatus, it is to be clearly understood that this description is made only by way of example and not as a limitation to the scope of the invention.

What is claimed is:

1. A load-measuring apparatus for measuring the deflection of a relatively stiff non-spring member comprising a non-spring member capable of flexing in a predetermined direction in proportion to a load thereon, two spaced apart rigid supports fixedly secured to said member and upstanding thereon, the upper ends of said supports being relatively movable toward and away from each other in proportion to the flexure of said member, means connected to the upper ends of said supports for measuring the distance therebetween as they move, said means including a device having spaced apart mounting portions secured to said upper ends, respectively, at least one transducer fitted to said device at a location between said mounting portions, said transducer being responsive to movement of said device, said device further including a beam element having opposite ends secured to said upper ends, respectively, said beam element being bendable in correspondence with bending of said non-spring member, said transducer being mounted on said beam element, said transducer being a strain gauge, said beam element being a spring metal bar, said strain gauge being mounted on one surface of said bar between the ends thereof.

2. The apparatus of claim 1 in which a second strain gauge is mounted on a surface of said bar opposite from the first strain gauge, and said bar is stressed to curve toward said non-spring member.

3. The apparatus of claim 2 in which said non-spring member is a vehicle axle, said supports are metal blocks welded to said axle, said blocks having flat upper surfaces which incline downwardly toward each other, said bar being flat and lying flat against said inclined surfaces and thereby being curved as aforesaid, members removably securing said bar to said inclined surfaces, four strain gauges on said bar, two on each surface thereof, and a bridge circuit containing said gauges in the legs thereof, respectively, one pair of said legs having therein the gauges on the top surface of said bar, the other pair of said legs having therein the gauges which are secured to the bottom surface of said bar, said circuit having two terminals at opposite corners, each terminal being connected between the two gauges of each gauge pair, and meter means connected to said terminals for indicating the change in resistance of said gauges.

4. The apparatus of claim 1 in which said beam element is a flat spring metal bar secured with the surfaces thereof normal to the plane of bending of said non-spring member, said non-spring member including a hollow axle, said bar being mounted internally of said axle on a pair of upstanding blocks fixedly secured to the bottom portion of said axle, said blocks having a clearance with the upper portion of said axle such that the upper ends thereof can move relative to said upper portion.

5. The apparatus of claim 4 including means for stressing the bar into a downward curvature, there being four strain gauges, two being mounted on the top surface and two on the bottom surface of said bar.

* * * * *